(12) United States Patent
Honeck et al.

(10) Patent No.: US 10,894,677 B2
(45) Date of Patent: Jan. 19, 2021

(54) GRAIN SPREADER FOR LOADING GRAIN BIN

(71) Applicant: Extron Company, Minneapolis, MN (US)

(72) Inventors: Randall G. Honeck, Maple Grove, MN (US); Dustin D. Paloranta, Brooklyn Park, MN (US); Greggory C. Phelps, Plymouth, MN (US)

(73) Assignee: Extron Company, Minneapolis, MN (US)

( * ) Notice: Subject to any disclaimer, the term of this patent is extended or adjusted under 35 U.S.C. 154(b) by 136 days.

(21) Appl. No.: 15/926,300

(22) Filed: Mar. 20, 2018

(65) Prior Publication Data

US 2019/0291980 A1   Sep. 26, 2019

(51) Int. Cl.
*B65G 69/04* (2006.01)
*B65G 65/32* (2006.01)

(52) U.S. Cl.
CPC ......... *B65G 69/0441* (2013.01); *B65G 65/32* (2013.01); *B65G 2814/027* (2013.01)

(58) Field of Classification Search
CPC ............ B65G 69/0441; B65G 69/0458; B65G 2814/027; B65G 2814/0282; B65G 65/32
USPC .................................................. 414/299, 301
See application file for complete search history.

(56) References Cited

U.S. PATENT DOCUMENTS

| | | | | |
|---|---|---|---|---|
| 655,552 | A * | 8/1900 | Gorton | C21B 7/20 414/206 |
| 3,682,394 | A * | 8/1972 | Shivvers | B65G 69/00 239/665 |
| 3,966,124 | A * | 6/1976 | Sukup | A01F 25/186 239/666 |
| 3,989,194 | A * | 11/1976 | Parker | A01D 87/0046 239/666 |
| 4,031,929 | A * | 6/1977 | Cobb | A01F 25/186 239/684 |
| 4,040,529 | A * | 8/1977 | Wurdeman | B65G 69/0441 414/301 |
| 4,342,532 | A * | 8/1982 | Voegele | B65G 69/0441 193/2 R |
| 4,902,185 | A * | 2/1990 | Dixon | B65G 69/0441 193/23 |
| 5,372,467 | A * | 12/1994 | Harris | B65G 69/0458 239/681 |
| 6,729,660 | B2 * | 5/2004 | Musser | A01F 25/183 285/184 |
| 6,981,831 | B2 * | 1/2006 | Lonardi | C21B 7/20 414/174 |
| 6,991,415 | B1 * | 1/2006 | Anschultz | B65G 69/0441 414/299 |
| 7,861,614 | B2 * | 1/2011 | Sim | B65G 69/0441 414/206 |

(Continued)

*Primary Examiner* — James Keenan
(74) *Attorney, Agent, or Firm* — Merchant & Gould P.C.

(57) ABSTRACT

A method and apparatus to facilitate the loading of a grain bin such that the level in the grain bin increases generally uniformly and the distribution of grain size in the grain bin is generally uniform as well. The method includes redirecting the flow of the grain from the conveyer as it flows into the grain bin. In one embodiment, the apparatus includes an adjustable leveling band for redirecting the grain uniformly to a plurality of radially extending chutes. In one embodiment, the angle of the chutes can also be easily adjusted.

23 Claims, 13 Drawing Sheets

(56) References Cited

U.S. PATENT DOCUMENTS

| | | | |
|---|---|---|---|
| 8,485,345 B2* | 7/2013 | Klutz | B65G 69/0458 198/535 |
| 8,708,632 B2* | 4/2014 | Toline | B65G 69/0466 414/299 |
| 10,302,177 B2* | 5/2019 | Koehler | B65G 65/4836 |

* cited by examiner

GRAIN SPREADER FOR LOADING GRAIN BIN

TECHNICAL FIELD

Grain bin filling apparatuses and related methods.

BACKGROUND

Grain bins (silos, grain elevators) are commonly used to store grain. Grain bins are typically tall cylindrical structures and include a central upper opening for loading. A screw conveyer (e.g., auger) or belt conveyer is typically used to deliver the grain to the upper opening. Directly feeding grain into the grain bin from the conveyer can cause the grain bins to be loaded in an undesirable manner. For example, one side of the grain bin can be loaded with much more grain than another side, which can cause an imbalance and stress on the structure of the grain bin. Even if the grain bin is loaded generally uniformly from a radial direction with a mound of grain along the center axis of the grain bin, the fines in the grain can be concentrated rather than distributed. The fines have a different viscosity than the larger grain structure and tend to concentrate in the center of the grain bin rather than being uniformly distributed in the grain bin along with the larger grains. It is desirable to load the grain bin in a manner that results in a generally uniform loading of the grain bin vertically and radially, and also results in an even distribution of the size of the grain in the grain bin.

SUMMARY

The present disclosure provides a method and apparatus to facilitate the loading of a grain bin such that the level in the grain bin increases generally uniformly and the distribution of grain size in the grain bin is generally uniform as well. The method includes redirecting the flow of the grain from the conveyer as it flows into the grain bin. In one embodiment, the apparatus includes an adjustable leveling band for redirecting the grain uniformly to a plurality of radially extending chutes.

DETAILED DESCRIPTION

Figure 1:
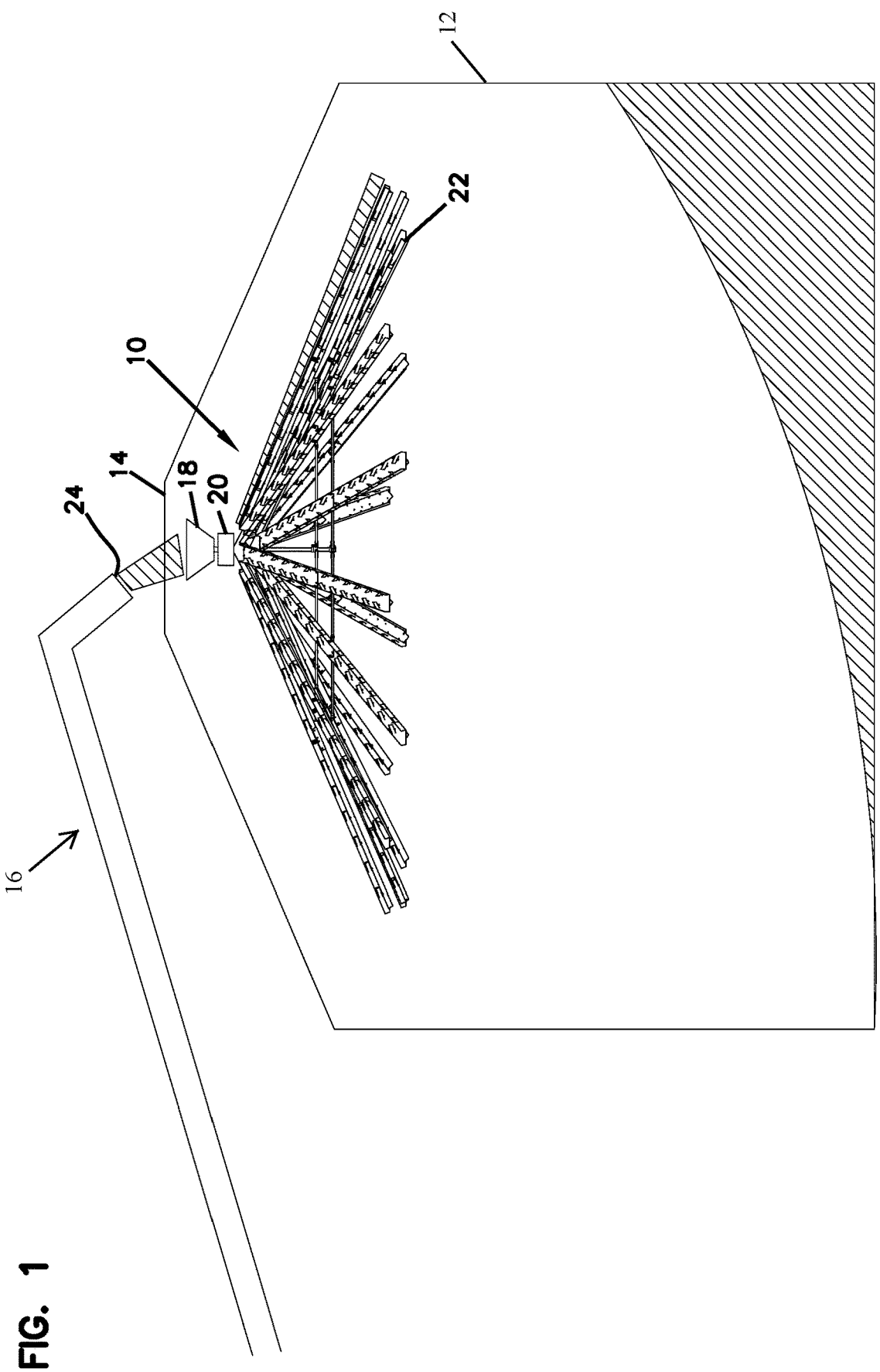
FIG. 1 depicts a grain bin loading apparatus that is not adjusted to compensate for the direction of loading.

The present disclosure provides a grain spreader 10 that can be adjusted to facilitate even and uniform loading of a grain bin 12. Typically, grain bins are loaded via a central opening 14 at the top of the grain bin 12. A conveyer 16, such as a screw auger, can be used to deliver the grain to the central opening 14. The grain typically exits the conveyer 16 at an angle relative to vertical. In other words, the grain typically does not exit the conveyer 16 in a perfectly downward direction (the flow path includes a lateral component). The grain exiting the conveyer 16 is funneled generally downwardly by a hopper 18 that directs the grain to a leveling band 20. In the depicted embodiment, the leveling band 20 is a cylindrical structure with an open top end and an open bottom end. In the depicted embodiment, the grain flow through and around the leveling band 20 is downwardly and outwardly through a plurality of downwardly and radially extending chutes 22. The chutes 22 include side openings and deflectors adjacent to the opening to direct the grain from the chute downwardly to the bottom of the grain bin 12. Unless certain accommodations are made, the loading of the grain bin 12 will generally be non-uniform because the grain entered the grain bin 12 with a lateral component (i.e., not perfectly vertically). The lateral component can depend on a number of factors, including the angle of the auger exit and the flow rate of the grain in the auger. To facilitate even and uniform loading of the grain bin 12, adjustments can be made to the grain spreader 10.

Figure 2:
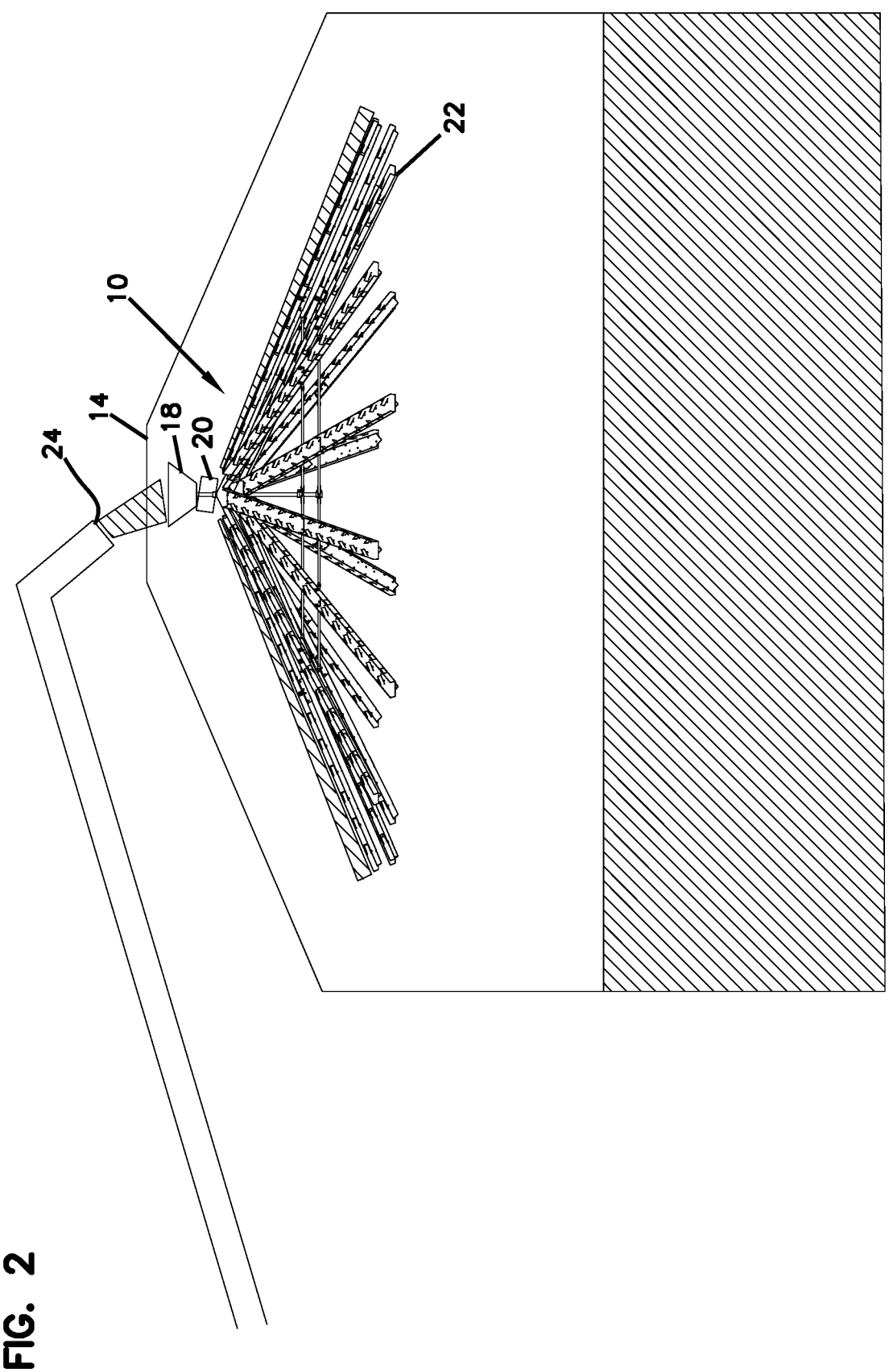
FIG. 2 depicts a grain bin loading method and apparatus that is adjusted to compensate for the direction of loading according to an embodiment of the present disclosure.
Figure 3:
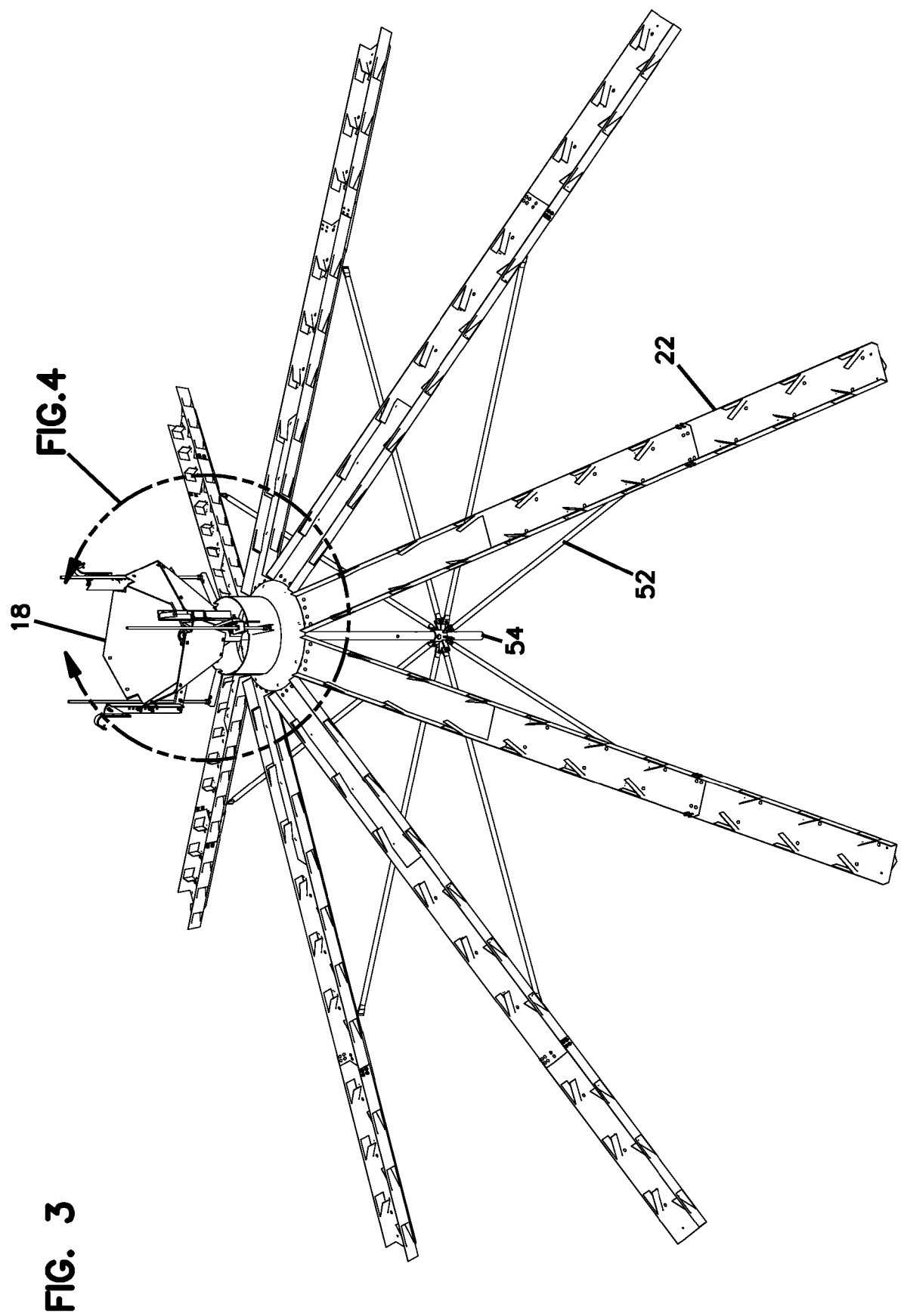
FIG. 3 is a perspective top view of an embodiment of the grain spreader of the present disclosure.
Figure 4:
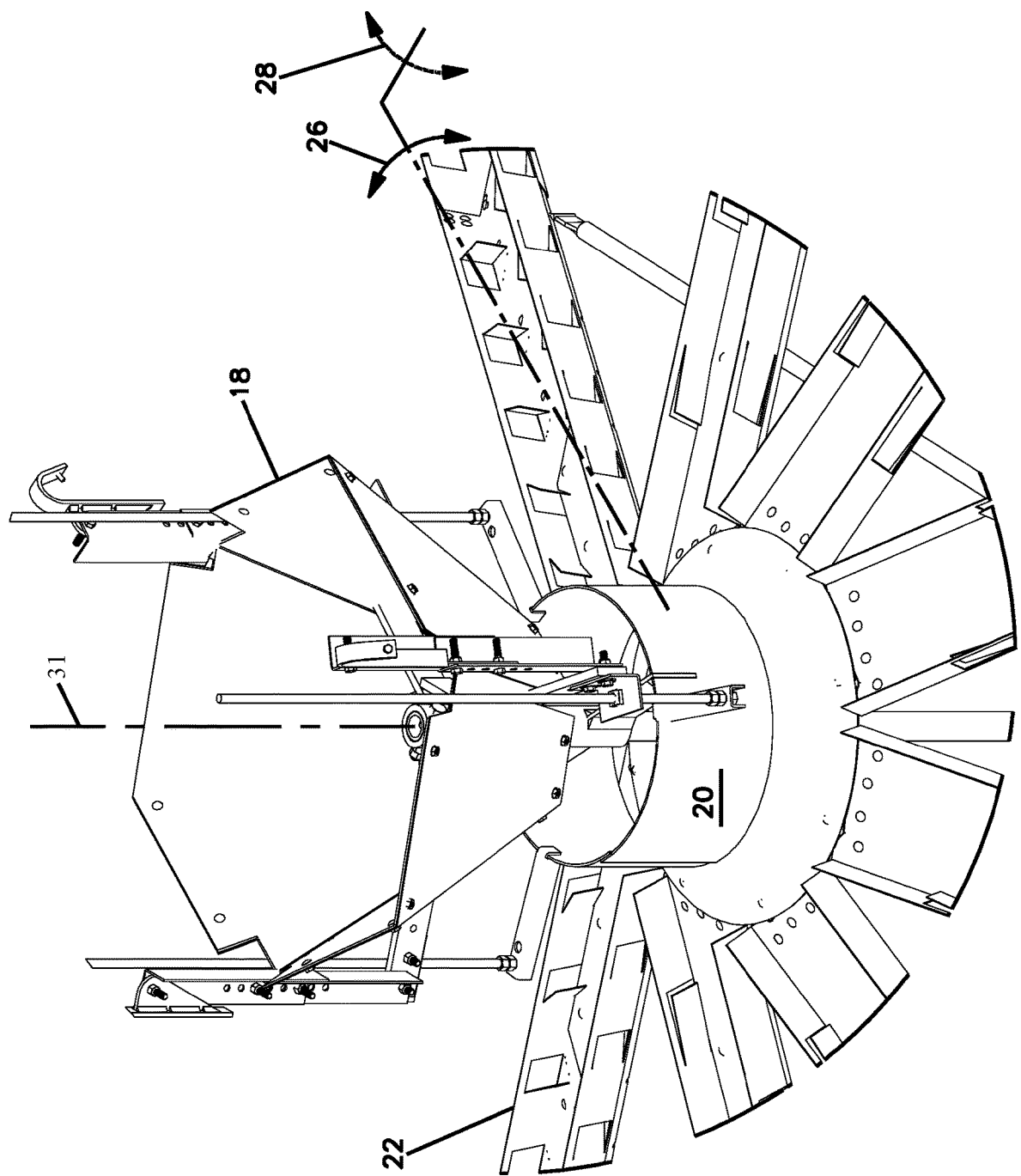
FIG. 4 is an enlarged view of a portion of FIG. 3.

Referring to FIG. 2, the leveling band 20 is canted to compensate for the direction of grain flow from the exit 24 of the conveyer 16. Referring to FIGS. 3-7, a particular embodiment of a grain spreader 10 according to one embodiment of the present disclosure is shown and described herein in further detail.

In the depicted embodiment, the leveling band 20 is configured such that it can be raised and lowered relative to the hopper 18 and chute 22 along its central axis 31. It is also configured such that its roll 26 and pitch 28 can be adjusted.

Figure 5:
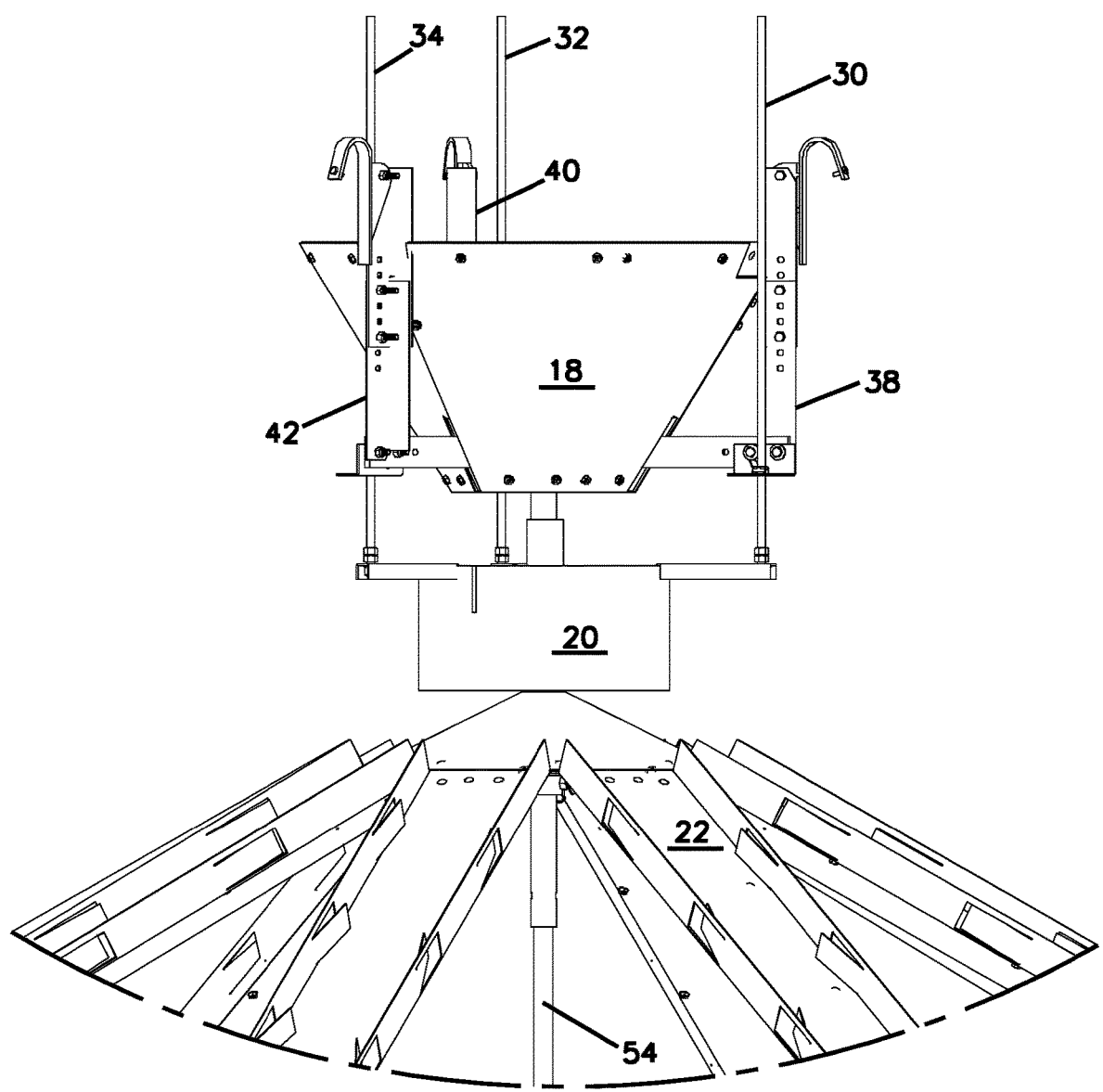
FIG. 5 is a side elevation view of the portion of the grain spreader of FIG. 3 wherein the leveling band is in a first orientation.
Figure 6:
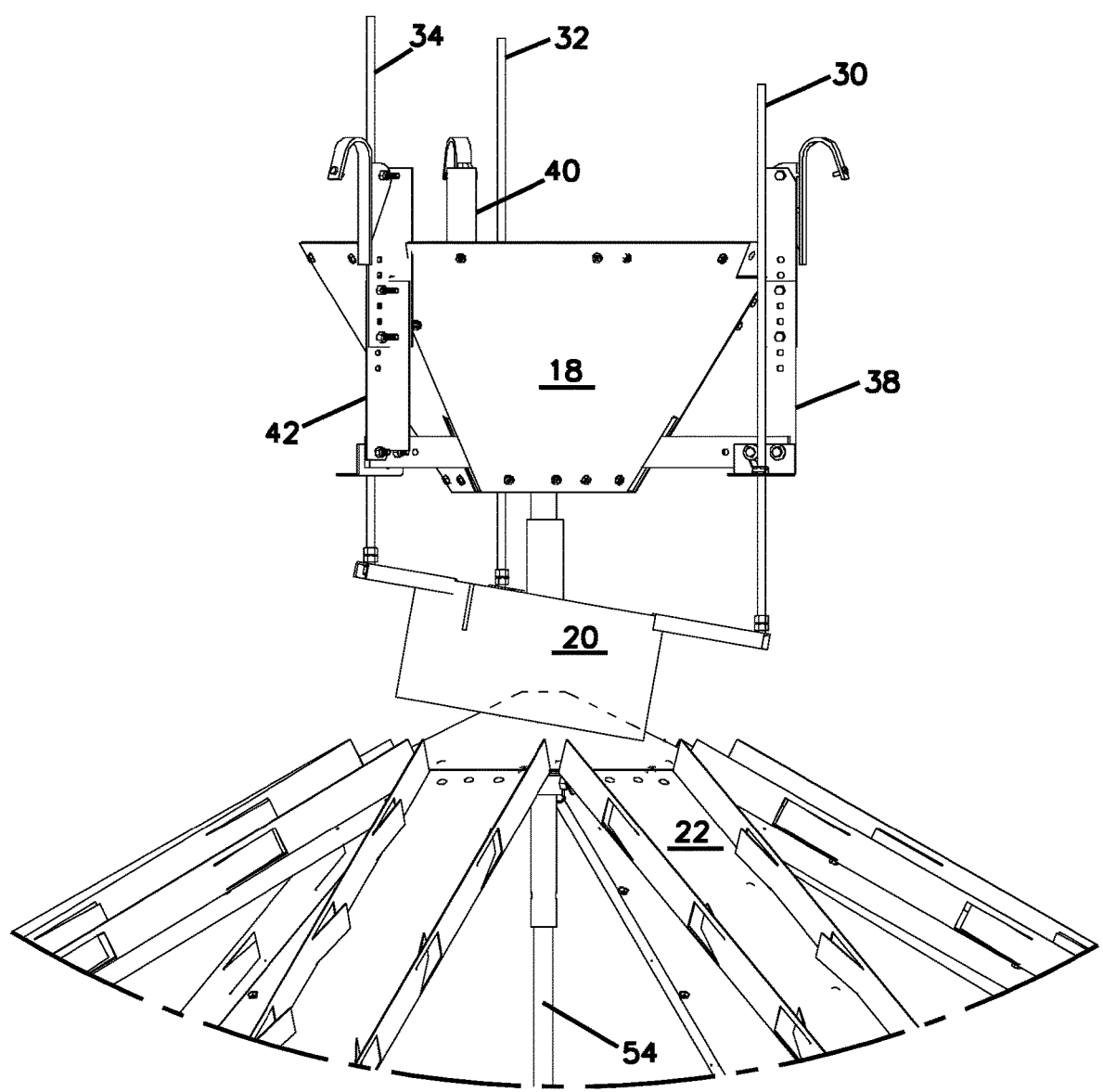
FIG. 6 is a side elevation view of the portion of the grain spreader of FIG. 3 wherein the leveling band is in a second orientation.
Figure 7:
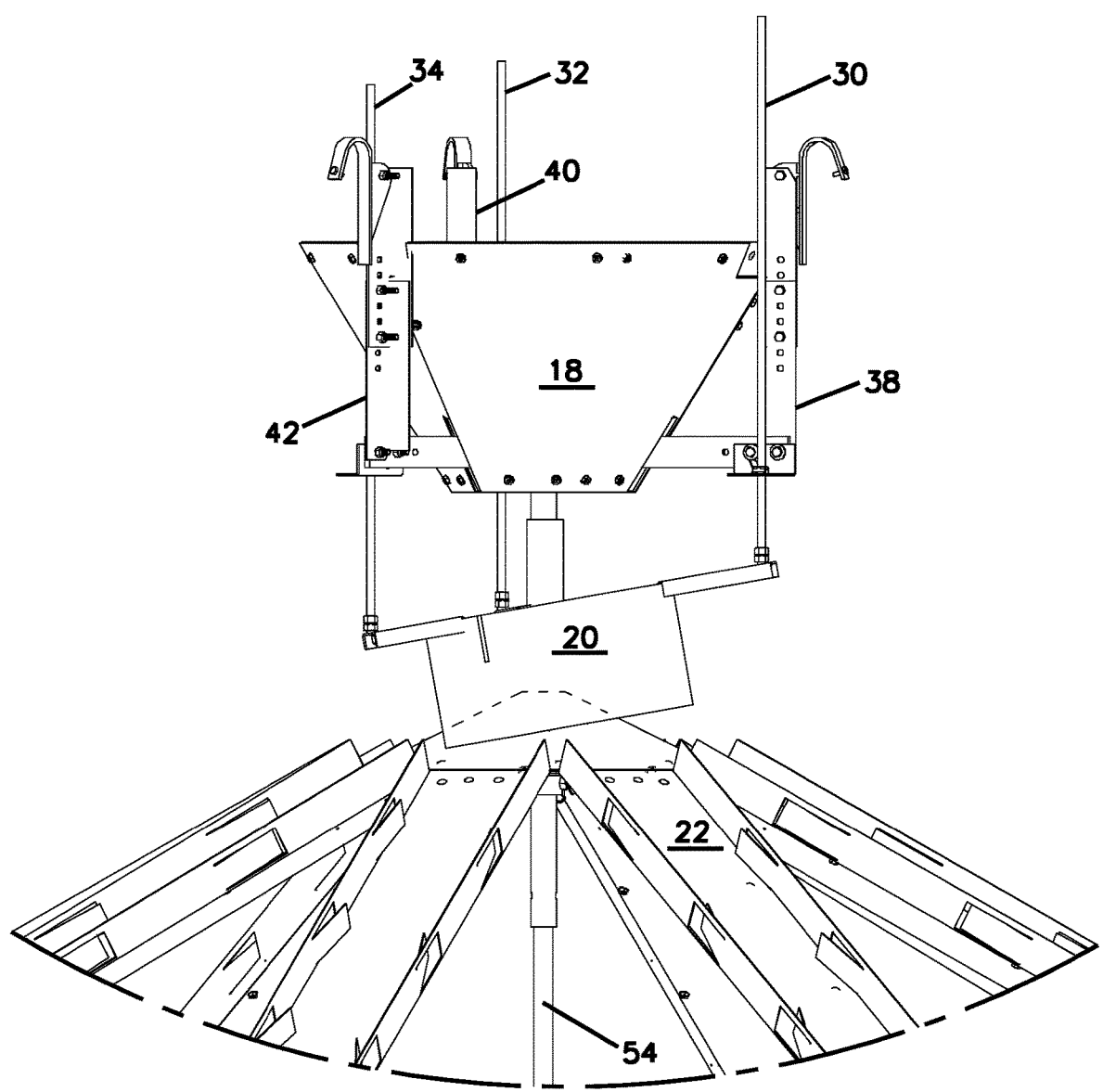
FIG. 7 is a side elevation view of the portion of the grain spreader of FIG. 3 wherein the leveling band is in a third orientation.
Figure 8:
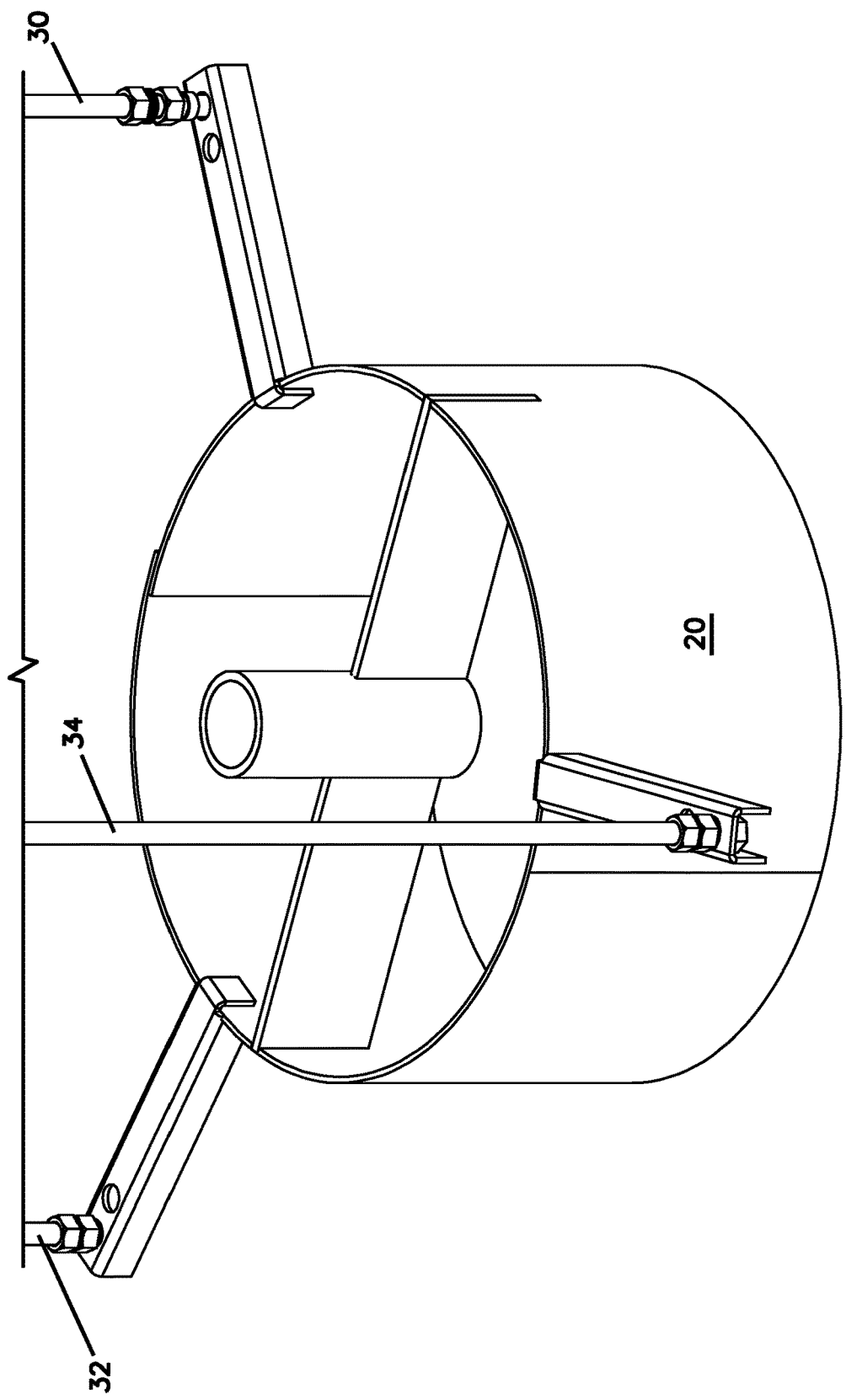
FIG. 8 is a top perspective view of a leveling band of the grain spreader of FIG. 3.
Figure 9:
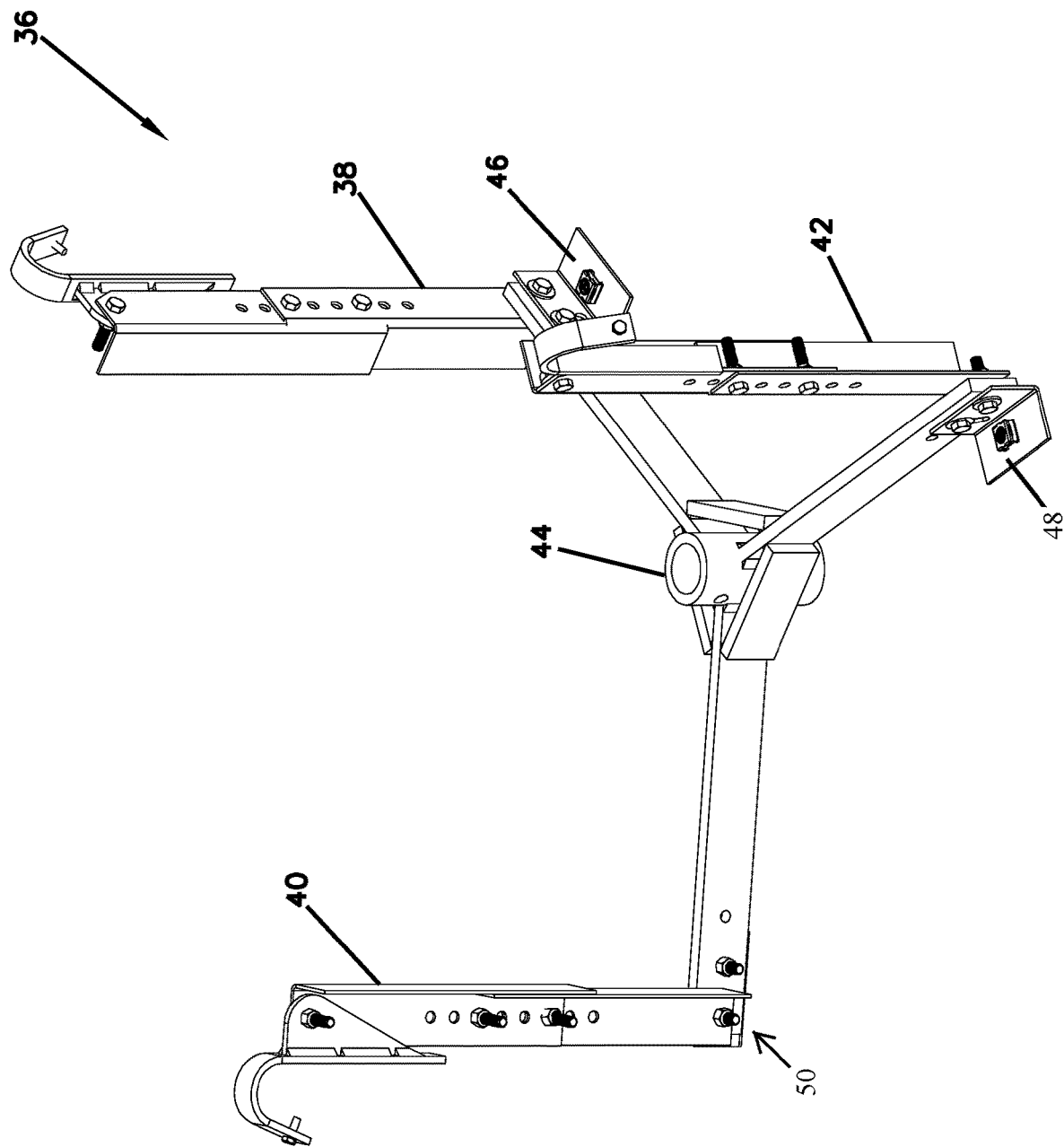
FIG. 9 is a top perspective view of a leveling band hanger assembly of the grain spreader of FIG. 3.

Referring to FIGS. 5-7, a number of orientations of the leveling band 20 is shown. In the depicted embodiment, a roll 26 and pitch 28 adjustment mechanism is configured to selectively adjust and set the roll 26 and pitch 28 orientation of the leveling band 20. In the depicted embodiment, the roll 26 and pitch 28 adjustment mechanism includes a plurality of rods (e.g., three rods 30, 32, 34) that are connected between the hopper 18 and the leveling band 20. The rods 30, 32, 34 are configured to pull and push on the leveling band 20 to change the orientation of the leveling band 20 as needed. In the depicted embodiment, each of the rods 30, 32, 34 is threaded and configured such that its effective length can be adjusted by rotating it about a longitudinal axis of the rod. In the depicted embodiment, a nut is secured to the end of the rods 30, 32, 34, which can be engaged with a hand-held driver by an operator located outside of the grain bin 12. The operator can change the roll 26 and pitch 28 (the tilt) of the leveling band 20 to adjust so that it distributes the grain onto the chutes 22 in an evenly balanced manner. In the depicted embodiment, the roll 26 and pitch 28 adjustment mechanism includes a hanger assembly 36 (FIG. 9) that threadly interfaces between the rods 30, 32, 34 that extend between the hopper 18 and the leveling band 20. In the depicted embodiment, the hanger assembly 36 includes legs 38, 40, 42 that support a centering collar 44 and a plurality of threaded interfaces 46, 48, 50. In the depicted embodiment, a first upper portion of a threaded rod 30, 32, 34 extends through the threaded interface 46, 48, 50 of the hanger assembly 36 and second lower end portions of the threaded rod 30, 32, 34 are pivotally attached to a portion of the leveling band 20. Rotation of the threaded rod 30, 32, 34 in a first direction (e.g., clockwise) extends the threaded rod 30, 32, 34 downwardly, thereby lowering the portion of the leveling band 20 connected to the second end of the threaded rod 30, 32, 34. Conversely, rotation of the threaded rod 30, 32, 34 in a second direction (e.g., counter clockwise) that is opposite to the first direction, raises the threaded rod 30, 32, 34 upwardly, thereby lifting the portion of the leveling band 20 connected to the second end of the threaded rod 30, 32, 34. In the depicted embodiment, there are three threaded rods 30, 32, 34 that extend between the hopper 18 and the leveling band 20, and they are spaced apart at 120 degrees relative to each other around the leveling band 20. In the depicted embodiment, the legs 38, 40, 42 of the hanger assembly 36 are adjustable and can be used to raise and lower the leveling band 20. However, in the depicted embodiment, the legs 38, 40, 42 are not configured to be adjusted while grain is flowing through the system. It should be appreciated that many alternative configurations are possible. For example, the rods 30, 32, 34 could be instead cables. Alternatively, the rods 30, 32, 34 could be gas or hydraulic cylinders rather than threaded. The rods 30, 32, 34 could also be telescoping pinned structures rather than threaded. In addition, alternative embodiments may not have a hanger assembly 36 or the hanger assembly 36 could be integrated with the hopper 18 as tabs that extend therefrom that engage the rods 30, 32, 34. Many other alternative configurations are also possible.

Figure 10:
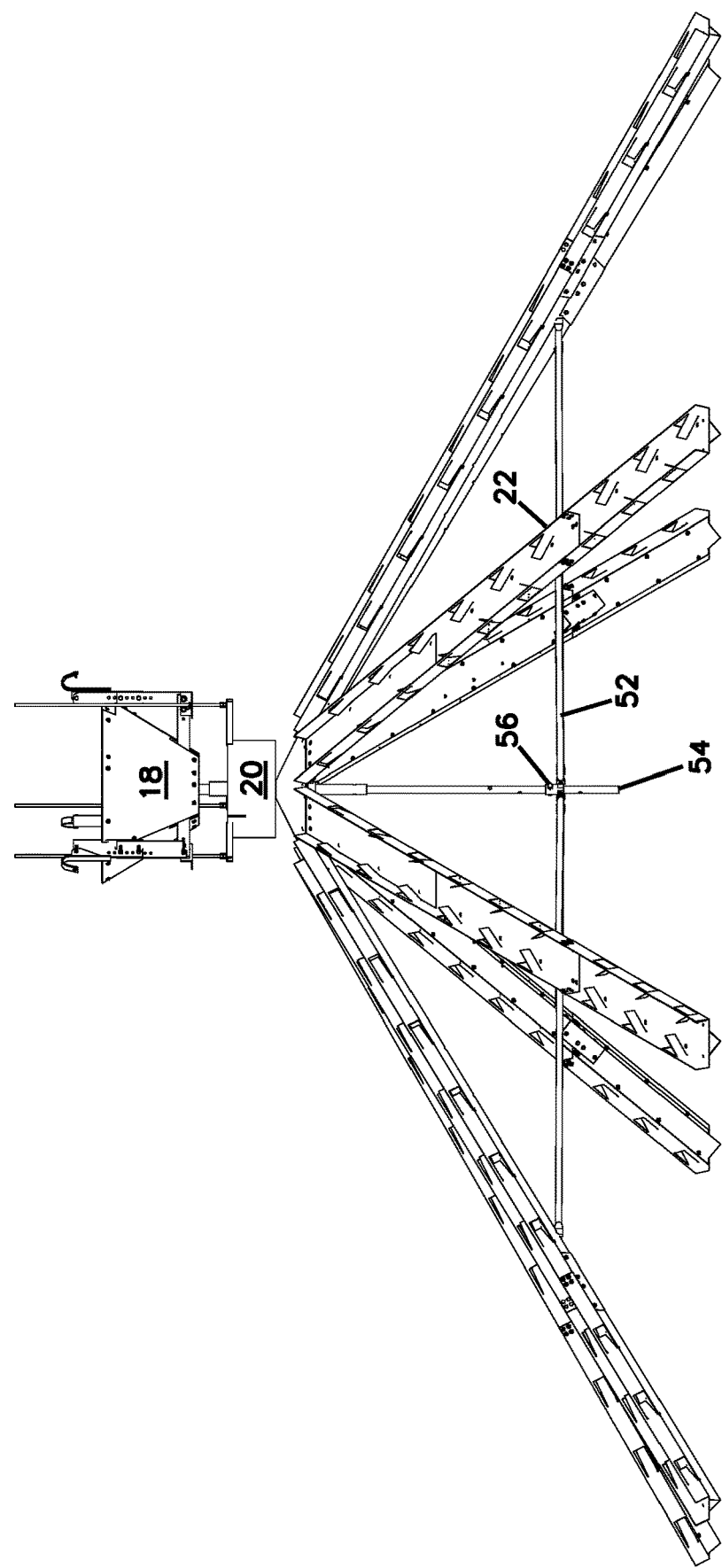
FIG. 10 is a side elevation view of the grain spreader of FIG. 3 with the chutes in a first orientation.
Figure 11:
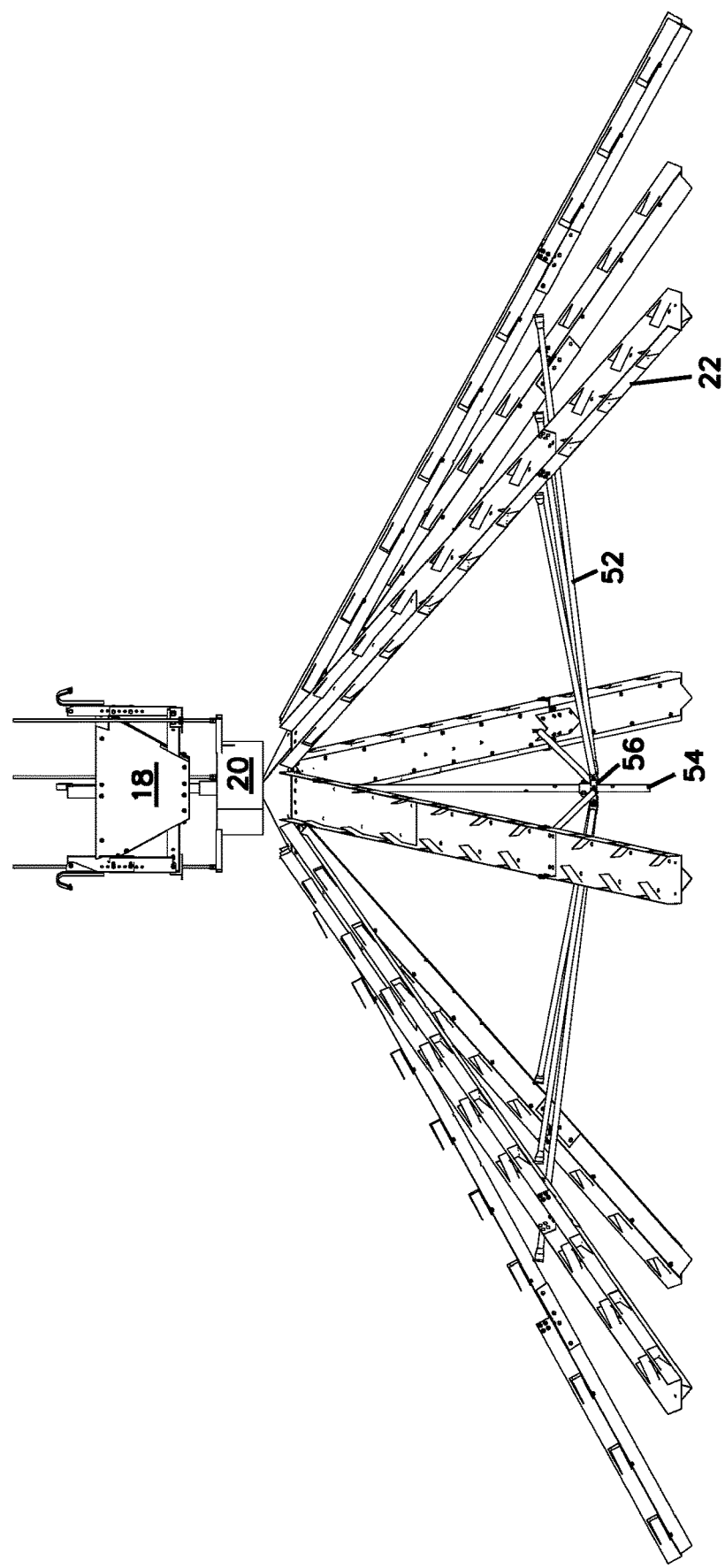
FIG. 11 is a side elevation view of the grain spreader of FIG. 3 with the chutes in a second orientation.
Figure 12:
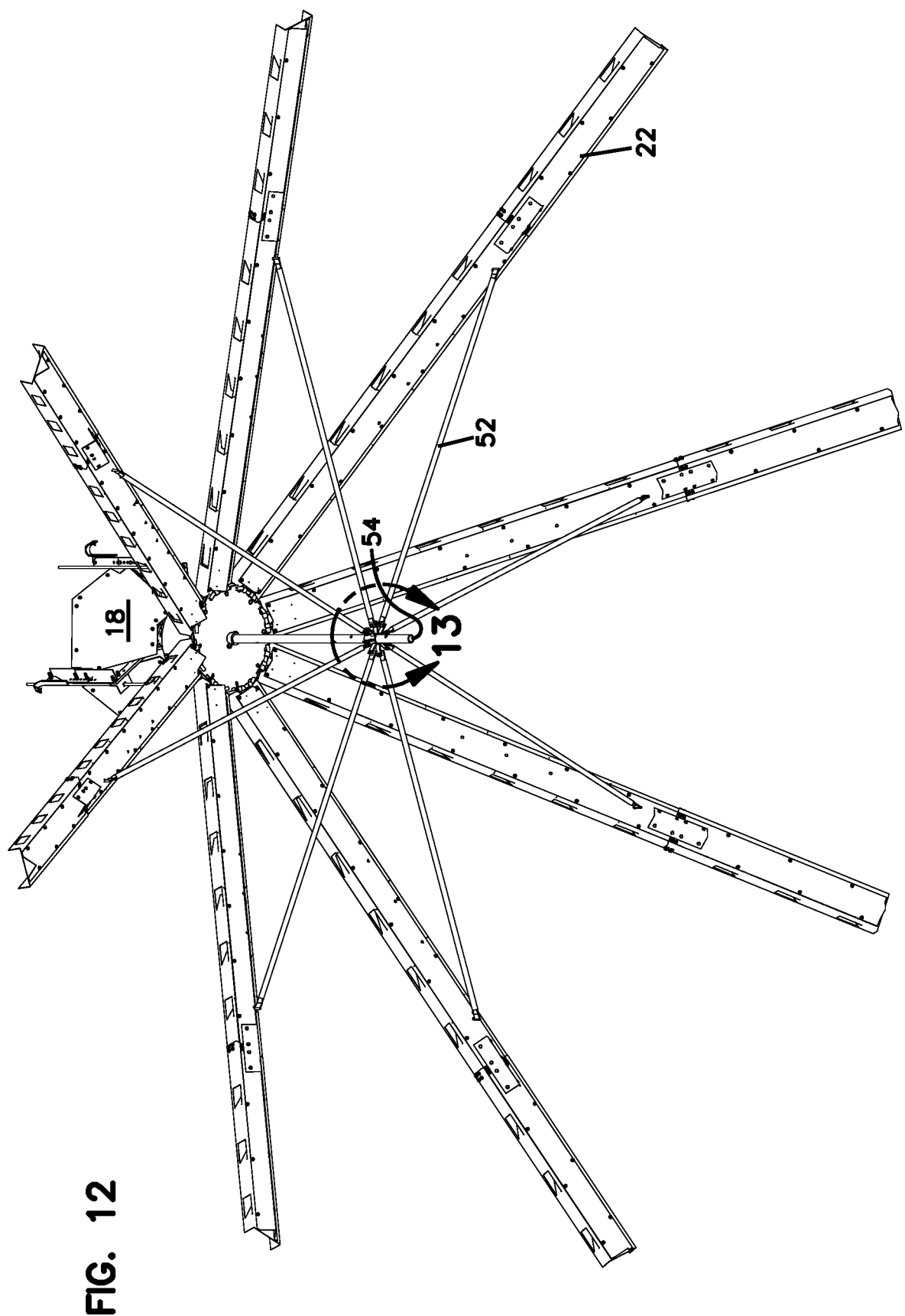
FIG. 12 is a bottom perspective view of the grain spreader of FIG. 3.
Figure 13:
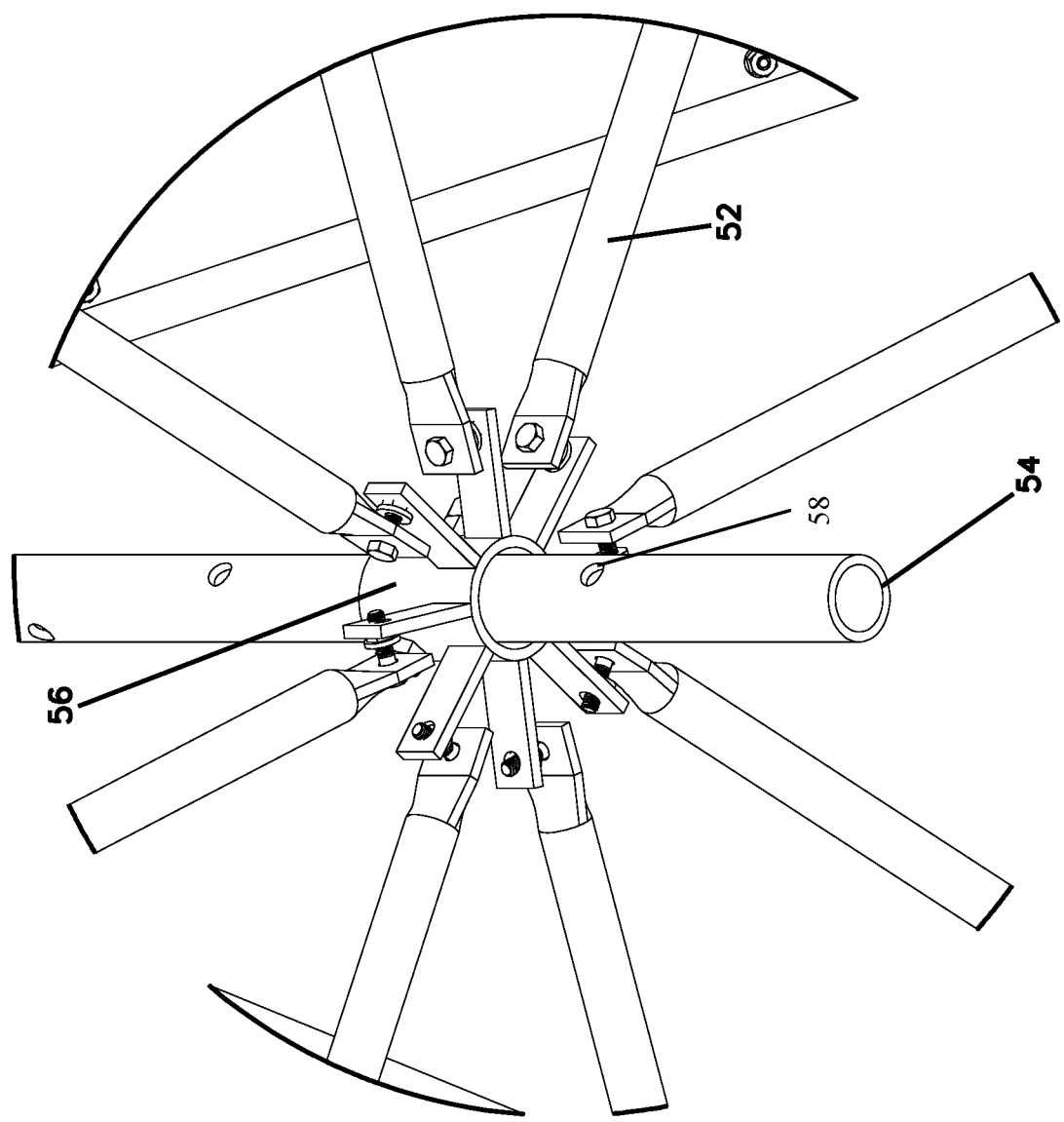
FIG. 13 is an enlarged portion of FIG. 12.

In the depicted embodiment, the plurality of downwardly and radially extending longitudinal chutes 22 distribute the grain from the leveling band 20 into a grain bin 12. Each chute 22 includes an upper first end portion and a lower second end portion. In the depicted embodiment, the upper first end portion of each chute 22 is pivotally attached below the leveling band 20. Each chute 22 is supported by a strut 52. In the depicted embodiment, each strut 52 extends from a center post 54 radially outwardly to the chute 22 that it supports. In the depicted embodiment, the grain spreader 10 includes a chute angle adjustment assembly configured to orientate the chutes 22 at a first angle (e.g., FIG. 10) relative to vertical or alternatively a second angle (e.g., FIG. 11) relative to vertical. In the depicted embodiment, the chute angle adjustment assembly is configured to change the angle of a plurality of chutes 22 simultaneously. In the depicted embodiment, each of the struts 52 includes a first end that is pivotally connected to a collar 56 that is positioned around the center post 54 and a second end that is pivotally connected to a portion of the chute 22 that it supports. The collar 56 is configured to move upwardly and downwardly along the center post 54 and be secured to the center post 54 when the desired angle of the chutes 22 is attained. In the depicted embodiment, the center post 54 includes a pin aperture 58 that is configured to receive pins that extend through the center post 54 and secures the collar 56 in place along the center post 54. It should be appreciated that many alternative configurations exist for adjusting and setting the downward angle of the chutes 22. In alternative embodiments, the collar 56 could be threaded (e.g., acme threads) on the center post 54 to raise and lower the chutes 22. Alternatively, the struts 52 themselves could be configured to extend and retract. Or the position of the connection between the struts 52 and the chutes 22 could be configured to adjust. Many other alternative configurations are also possible.

The present disclosure also provides a method of evenly distributing grain while loading a grain bin 12. The method includes the step of adjusting the tilt of a leveling band 20 to account for the direction of grain feeding into the grain bin 12. In the depicted embodiment, the step of adjusting the tilt is accomplished with the operator located primarily outside of the grain bin 12. In the depicted embodiment, the step of adjusting the tilt is accomplished with a hand-held driver that rotates a threaded rod 30, 32, 34, thereby raising and lowering a portion of the leveling band 20 causing it to tilt relative to a horizontal plane. The method further comprises the step of adjusting the downward angle of a plurality of chutes 22 located below the leveling band 20 by adjusting the position of a collar 56 that rides along a center post 54. It should be appreciated that many alternatives to the method exist. Some alternatives include more steps, others include less steps, and yet others include different steps.

It should be appreciated that many other configurations are also possible. For example, in an alternative embodiment, elastic members or springs can be used to bias the leveling band in a downward direction to provide added stability and limit float and dampen vibrations. In another embodiment, an upwardly ending center longitudinal member that extends along or parallel to the center axis of the leveling band can be used to change roll and pitch in place of cables. In other embodiments, a ball screw configuration can be used to adjust the roll and pitch of the leveling band. Many other alternative configurations are also possible.

What is claimed is:

1. A grain spreader, comprising:
   a hopper, the hopper oriented to funnel grain in a downward direction;
   a leveling band positioned below and downstream of the hopper;
   an adjustment mechanism configured to adjust and set:
   i) a roll of the leveling band relative to the hopper about a first axis;
   ii) a pitch of the leveling band relative to the hopper about a second axis perpendicular to the first axis; and
   iii) a height of the entire leveling band relative to the hopper along a third axis perpendicular to the first and second axes; and
   a plurality of radially and downwardly extending chutes positioned below and downstream of the leveling band;
   wherein the adjustment mechanism includes a plurality of rods connected to the leveling band that are configured to pull and push on the leveling band to change the roll of the leveling band and the pitch of the leveling band.

2. The grain spreader of claim 1, wherein the plurality of rods are configured to pull and push on the leveling band to change the height of the entire leveling band.

3. The grain spreader of claim 2, wherein at least one of the plurality of rods is threaded and configured such that its effective length can be adjusted by rotating the rod about a longitudinal axis of the rod.

4. The grain spreader of claim 1, wherein the plurality of rods are threaded rods configured such that the roll and the pitch of the leveling band can be adjusted by rotating at least one of the plurality of rods about a longitudinal axis of the rod.

5. The grain spreader of claim 1, wherein the adjustment mechanism includes a hanger assembly that interfaces with the rods, wherein the hanger assembly includes legs that support a centering collar.

6. The grain spreader of claim 5, wherein the plurality of rods are threaded rods that interface with threaded interfaces of the hanger assembly, wherein a first upper portion of a first of the threaded rods extends through one of the plurality of threaded interfaces of the hanger assembly and a second lower end portion of the first of the threaded rods is pivotally attached to a portion of the leveling band, wherein rotation of the first of the threaded rods in a first direction extends the first of the threaded rods downwardly thereby lowering the portion of the leveling band connected to the second end of the first of the threaded rods and rotation of the first of the threaded rods in a second direction that is opposite to the first direction raises the first of the threaded rods upwardly thereby lifting the portion of the leveling band connected to the second end of the first of the threaded rods.

7. The grain spreader of claim 1, wherein the plurality of rods includes three rods that are spaced apart evenly around the leveling band.

8. The grain spreader of claim 1, wherein the leveling band is a cylindrical structure with an open top end and an open bottom end.

9. The grain spreader of claim 1, wherein the chutes are configured to distribute the grain from the leveling band into a grain bin, wherein each of the chutes includes an upper first end portion and a lower second end portion, wherein the upper first end portion is pivotally attached below the leveling band, wherein each of the chutes is supported by a strut, wherein each of the struts extends from a center post radially outwardly to the corresponding chute.

10. The grain spreader of claim 9, further comprising a chute angle adjustment assembly configured to orientate the chutes at a first angle relative to vertical or alternatively a second angle relative to vertical, wherein the first and second angles are different, and wherein the chute angle adjustment assembly is configured to change the angle of the plurality of chutes simultaneously.

11. The grain spreader of claim 9, wherein each of the struts includes a first end that is pivotally connected to a collar that is positioned around the center post and a second end that is pivotally connected to a portion of the chute that it supports, wherein the collar is configured to move upwardly and downwardly along the center post and be secured to the center post.

12. The grain spreader of claim 9, wherein the center post includes pin apertures that extend through the center post for receiving pins that secure the collar.

13. A method of distributing grain while loading a grain bin comprising:
controlling a direction and a flow of grain feeding into the grain bin by:
adjusting a roll of a leveling band relative to a hopper about a first axis;
adjusting a pitch of the leveling band relative to the hopper about a second axis perpendicular to the first axis;
adjusting a height of the entire leveling band relative to the hopper about a third axis perpendicular to the first and second axes; and
adjusting a downward angle of a plurality of chutes located below the leveling band by adjusting the position of a collar that rides along a center post,
wherein the adjusting of the roll and the adjusting of the pitch are accomplished by causing a plurality of rods connected to the leveling band to pull or push the leveling band.

14. The method of claim 13, wherein the steps of adjusting are accomplished by an operator located primarily outside of the grain bin.

15. The method of claim 13, wherein the adjusting the roll or the adjusting the pitch is accomplished with a hand-held driver that rotates one of the rods and causes the leveling band to tilt relative to a horizontal plane defined by the first and second axes.

16. A grain spreader for funneling grain in a downward direction from a hopper to a plurality of radially and downwardly extending chutes, comprising:
a leveling band adapted to be positioned below and downstream of the hopper and adapted to be positioned above and upstream of the chutes; and
an adjustment mechanism configured to adjust and set a roll and a pitch of the leveling band relative to the hopper to each of at least five radially different tilt directions from a vertical axis without rotating the leveling band about the vertical axis, the roll being about a first horizontal axis and the pitch being about a second horizontal axis perpendicular to the first horizontal axis,
wherein the adjustment mechanism includes a hanger assembly that interfaces with a plurality of rods connected to the leveling band.

17. The grain spreader of claim 16, wherein:
the plurality of rods are configured to pull and push on the leveling band to change the roll and the pitch of the leveling band relative to the hopper; and
the hanger assembly includes legs that support a centering collar.

18. The grain spreader of claim 16, wherein the adjustment mechanism is further configured to adjust and set a height of a center of the leveling band relative to the hopper along the vertical axis.

19. A grain spreader for funneling grain in a downward direction from a hopper through a leveling band positioned below and downstream of the hopper to a plurality of radially and downwardly extending chutes positioned below and downstream of the leveling band, comprising:
an adjustment mechanism configured to adjust and set:
i) a roll of the leveling band relative to the hopper about a first axis;
ii) a pitch of the leveling band relative to the hopper about a second axis perpendicular to the first axis; and
iii) a height of the entire leveling band relative to the hopper along a third axis perpendicular to the first and second axes,
the adjustment mechanism including a plurality of rods adapted to be connected between the hopper and the leveling band and configured to pull and push on the leveling band to change the roll, the pitch and the height of the leveling band.

20. The grain spreader of claim 19, wherein at least one of the plurality of rods is threaded and configured such that its effective length can be adjusted by rotating the rod about a longitudinal axis of the rod.

21. The grain spreader of claim 19, wherein the plurality of rods are threaded rods configured such that the roll or the pitch of the leveling band can be adjusted relative to the hopper by rotating at least one of the plurality of threaded rods about a longitudinal axis of the threaded rod.

22. The grain spreader of claim 19, wherein the adjustment mechanism includes a hanger assembly configured to interface with the rods, wherein the hanger assembly includes legs that support a centering collar and a plurality of threaded interfaces.

23. The grain spreader of claim 19, wherein the adjustment mechanism is configured to adjust and set a roll and a pitch of the leveling band relative to the hopper to each of at least five radially different tilt directions from the third axis without rotating the leveling band about the third axis.

* * * * *